US005133828A

United States Patent [19]

Jacques

[11] Patent Number: 5,133,828

[45] Date of Patent: Jul. 28, 1992

[54] REVERSIBLE PRESSURE SEALER ROLLERS

[75] Inventor: Roger A. Jacques, East Rochester, N.H.

[73] Assignee: Moore Business Forms, Inc., Grand Island, N.Y.

[21] Appl. No.: 787,405

[22] Filed: Nov. 4, 1991

Related U.S. Application Data

[63] Continuation-in-part of Ser. No. 605,797, Oct. 31, 1990.

[51] Int. Cl.[5] B32B 31/00

[52] U.S. Cl. 156/555; 156/441.5; 156/556; 156/579; 100/93 RP

[58] Field of Search 156/553, 555, 556, 582, 156/363, 364, 579, 583.1, 441.5, 442.1, 442.2; 493/208, 254, 264, 435; 100/93 RP

[56] References Cited

U.S. PATENT DOCUMENTS 3,027,285 3/1962 Eisner et al. 156/555 X 3,484,325 12/1969 Pendleton 156/582

5,080,751 1/1992 DeWan 156/579

*Primary Examiner*—Richard Bueker

*Assistant Examiner*—James J. Engel, Jr.

*Attorney, Agent, or Firm*—Nixon & Vanderhye

[57] ABSTRACT

A pressure sealer for sealing pressure sensitive adhesive strips on business forms has only a single set of sealing rollers forming a nip. One roller is gear driven by a D.C. motor, and a spring applies a biasing force to press the rollers into contact with each other. A forward sensor and a reverse sensor are positioned just before the nip of the rollers, in a support surface for business forms, and cooperate with a computer chip to control the motor to drive a business form in a first direction between the rollers, until it has almost completely passed through the nip. Then the motor is reversed to drive the business form through the nip again in a second direction opposite the first direction. The business form is manually fed to, and removed from, the nip.

16 Claims, 3 Drawing Sheets

REVERSIBLE PRESSURE SEALER ROLLERS

CROSS-REFERENCE TO RELATED APPLICATION

This application is a continuation-in-part of application Serial No. 07/605,797 filed Oct. 31, 1990.

BACKGROUND AND SUMMARY OF THE INVENTION

In the parent application, a simple and inexpensive pressure sealer is provided which is designed to handle business forms on a manual feed or semi-manual feed basis. While the invention in the parent application is entirely suitable for sealing small batches of documents by applying pressure to pressure sensitive adhesive strips, and while the invention of the parent application is extremely simple, according to the present invention it is desired to make a pressure sealer that is even simpler yet.

According to the present invention, a pressure sealer is provided that includes only one set of pressure applying rollers rather than two, as in the parent application. The bottom roller is driven by a reversible D.C. electric gear motor. The upper roller is biased by a spring into contact with the lower roller, and both rollers have a narrow periphery, typically less than about one inch, so that they apply a sealing force only at the pressure sensitive adhesive strips, not other parts of the business forms acted on by them. Sensors are also associated with the rollers, as well as a computer driver chip control, so as to effect braking and reverse rotation of the rollers once a form has passed almost completely through the nip, so that the form is acted upon by the sealing rollers twice to ensure a positive seal.

According to one aspect of the present invention, a pressure applying apparatus for applying pressure to business forms to activate pressure sensitive adhesive associated with the forms to seal one part of the form to another, comprises the following elements: A frame including a business form support surface. First and second narrow periphery rollers, rotatable about parallel first and second axes, and biased together to form a nip. Reversible drive means for driving at least one of the rollers alternately clockwise and counterclockwise. Sensor means for sensing the position of a business form supported by the business form support surface, the sensor means being positioned adjacent, but spaced from in the dimension of elongation of the support surface and perpendicular to the first and second axes, the nip. And, control means connected to the sensor means and the reversible drive means for driving a business form sensed by the sensor through the nip in a first direction along the support surface dimension of elongation so that a compressive sealing force is applied thereto, and after the business form has passed almost completely through the nip in the first direction, reversing the drive means to drive the business form through the nip again in a second direction,opposite the first direction.

The sensor means preferably comprises two sensor elements adjacent each other, a first sensor for initiating and controlling, with the control means, drive of the business form in the first direction, and a second sensor element, located closer to the nip than the first sensor, for initiating and controlling, with the control means, drive of the business form in the second direction. The sensors preferably are reflective sensors, while the drive means comprises a D.C. electric gear motor, and the control means comprises a computer drive chip. The first roller axis may be movably mounted, and the second roller axis stationarily mounted, with the first and second rollers biased together by spring biasing means acting on the first roller, with the electric motor connected only to the second roller. A form edge guide may extend perpendicular to the support surface and the roller axes, and adjacent the rollers and nip, to facilitate feeding of the forms into operative association with the rollers.

According to another aspect of the present invention a method of handling business forms, each having at least one strip of pressure sensitive adhesive of a predetermined width for affixing one part of each business form to another part, utilizing a machine having narrow width rollers which apply a sealing force at a nip, is provided. The method comprises the following steps: (a) Manually feeding a business form into operative association with the nip of the rollers, with at least one strip of adhesive aligned with the nip. (b) Rotating the rollers so that the business form is driven through the nip in a first direction, a sealing force being applied by the rollers only to the approximate area of the predetermined width of adhesive of the at least one adhesive strip. (c) Just prior to the form being driven completely through the nip, stopping the rollers, and reversing the direction of rotation thereof so that the business form is driven through the nip in a second direction, opposite the first direction. And, (d) after the business form has been driven through the nip in the second direction, manually removing it from operative association with the machine. Steps (b) and (c) are preferably practiced automatically. Typically the business form has a plurality of strips of pressure sensitive adhesive, and there are the further steps—after step (d)—of rotating the form to align a second strip of pressure sensitive adhesive with the rollers, and then repeating steps (a) - (d) for the second strip.

It is the primary object of the present invention to provide a simple pressure applying apparatus for sealing business forms with pressure sensitive adhesive, with a simple method of operation thereof. This and other objects of the invention will become clear from an inspection of the detailed description of the invention, and from the appended claims.

DETAILED DESCRIPTION OF THE DRAWINGS

Figure 1:
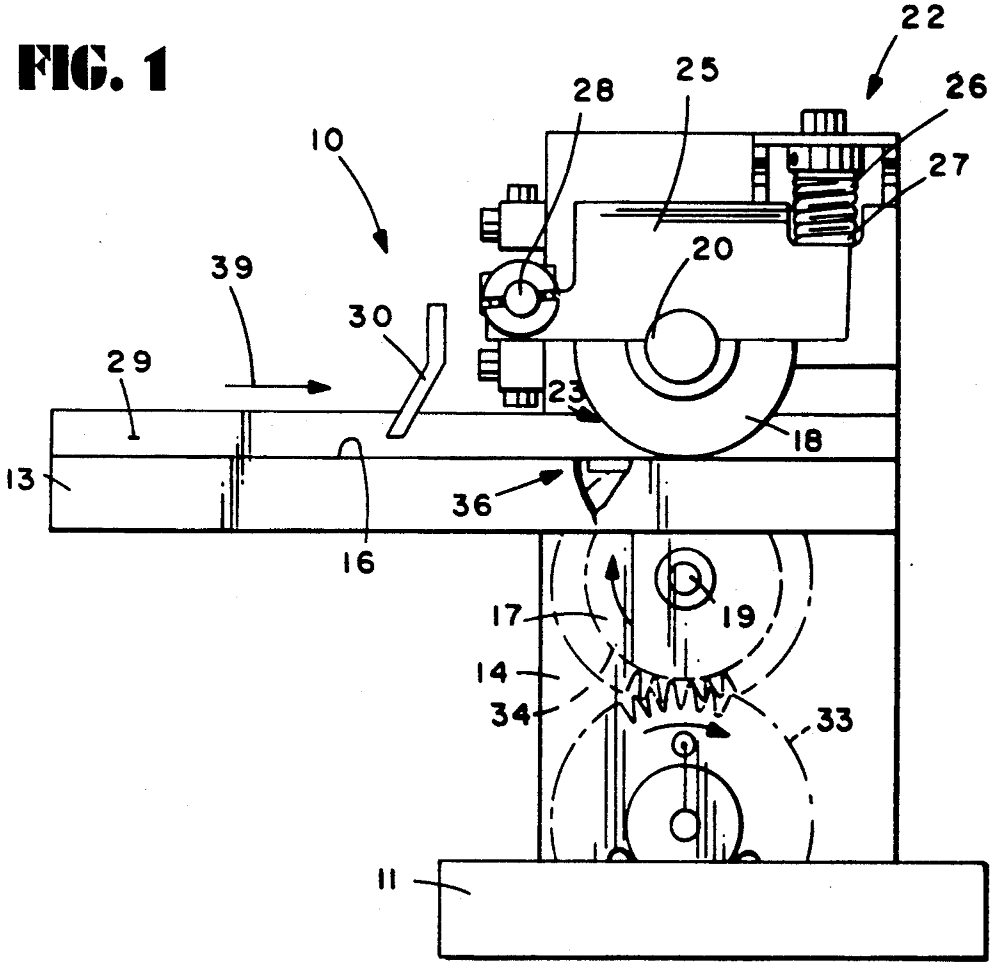
FIG. 1 is a side view, with the covering casing removed for clarity of illustration, of an exemplary pressure sealer according to the invention.
Figure 2:
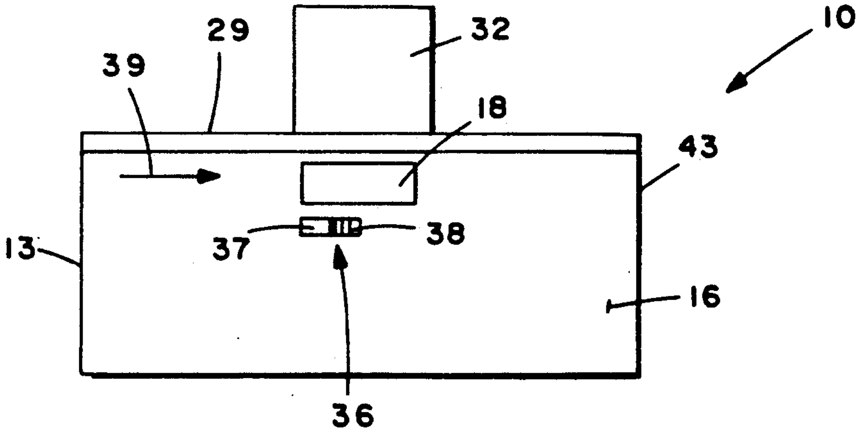
FIG. 2 is a top view of the rollers, motor, and support structures, of the sealer of FIG. 1.

An exemplary pressure sealer apparatus for applying pressure to business forms to activate pressure sensitive adhesive associated with the forms to seal one part to another is illustrated generally by reference numeral 10 in FIGS. 1 and 2. The apparatus 10 is preferably adapted to be mounted on a table top, being small in size, simple in construction, and readily transportable from place to place. It is designed primarily for manual or semi-manual operation, effecting proper pressure sealing of adhesive strips utilizing a compressive force application.

One of the basic elements that the machine 10 comprises a frame. The frame is typically formed of several different components including a base 11, a lead-in platform 13 for supporting business forms on a top surface 16 thereof, a main support 14, and a cosmetic outer enclosure (not shown) for the portions thereof above the platform 13.

First and second narrow periphery rollers 17, 18 are provided rotatable about parallel first and second axes defined by the shafts 19, 20 respectively, the axes 19, 20 preferably being in the same vertical plane. Each of the rollers 17, 18 is preferably only about one inch, or less, in width. The outer peripheries of the rollers 17, 18 are biased together, such as by spring means 22, to form a nip 23. The manner in which the upper roller 18, and shaft 20 associated therewith, and the spring means 22 are designed may be identical to that in the parent application except that that the spring means 22 biases only one roller 18 and its associated mounting yoke 25, rather than two. See the coil spring 26 of the spring means 22 engaging the surface 27 of the yoke 25 opposite yoke mounting shaft 28.

It is noted that the nip 23 of the rollers 17, 18 is at approximately the level of the business forms support surface 16 of the frame platform 13. Also, there preferably is provided a form edge guide 29 extending perpendicular to the support surface 16 and the roller axes defined by the shafts 19, 20, and adjacent the rollers 19, 20 and nip 23. A safety flap 30 may also be provided, like that in the parent application.

The apparatus 10 also comprises a reversible drive means for driving at least one of the narrow width rollers 17, 18 alternately clockwise and counterclockwise. Preferably the reversible drive means comprises a motor 32 (see FIG. 2). Desirably, the motor 32 is a Barber-Colman or equivalent, D.C. electric gear motor (see gear 33 in FIG. 1) and it is operatively connected directly to the bottom roller 17, not requiring the gear 33 thereof engaging a gear 34 associated with the lower roller 17 (see FIG. 1). The axis defined by shaft 19 for the bottom roller 17 is stationary and rotating, while the axis defined by shaft 20 is displaceable upwardly, against the biasing force of the spring means 22.

The apparatus 10 also comprises sensor means 36 for sensing the position of a business form supported by the surface 16 (and against guide 29). The sensor means 36 are positioned adjacent, but spaced from (in the dimension of elongation of the support surface 16 and perpendicular to the axes defined by shafts 19, 20) the nip 23, as is seen in both FIGS. 1 and 2. The sensor means 36 preferably comprise a first, forward sensor 37, and a second, more rearward (in the direction of arrow 39), sensor 38. Both of the sensors 37, 38 preferably comprise reflective sensors.

Figure 3:
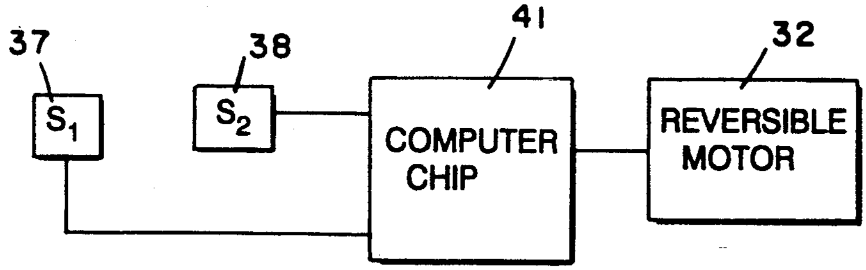
FIG. 3 is a control schematic illustrating interconnection between the major control components for the sealer of FIGS. 1 and 2.
Figure 4A:
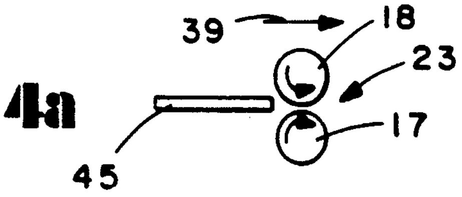
FIGS. 4*a*–4*d* schematically illustrate the method of sealing business forms with a single set of rollers, as according to the present invention.
Figure 4B:
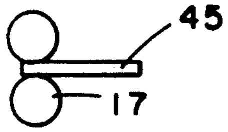
Figure 4C:
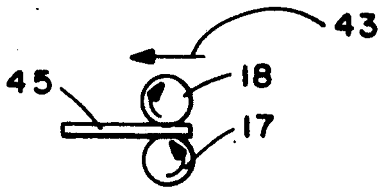
Figure 4D:
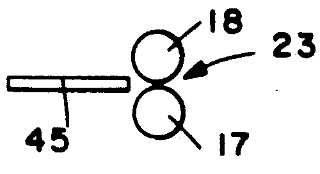

The apparatus 10 also comprises control means, such as the computer chip 41, schematically illustrated in FIG. 3 (e.g. logic and a Sprague UDN2954W driver chip). The control means 41 is connected to the sensors 37, 38 and the reversible motor 32 for driving a business form sensed by the sensor 37 through the nip 23 in the first direction 39 along the support surface 16 dimension of elongation so that a compressive sealing force is applied thereto, and after the business form has passed almost completely through the nip 23 in the first direction 39, reversing the motor 32 to drive the business form through the nip 23 again in a second direction 43 opposite the first direction 39. FIGS. 4through **4*d* illustrate this action. The business form 45 passes to the nip 23, and is driven by the rollers 17, 18 (while a compressive sealing force is being applied) in the direction 39, until the form 45 passes almost completely through the nip 23 (the FIG. 4*b* position). Then, the motor 32 is automatically braked then reversed so that the form 45 is driven in the second direction 43 (see FIG. 4*c*) until it is driven out between the nip 23, at which point the form 45** is manually removed.

Figure 5:
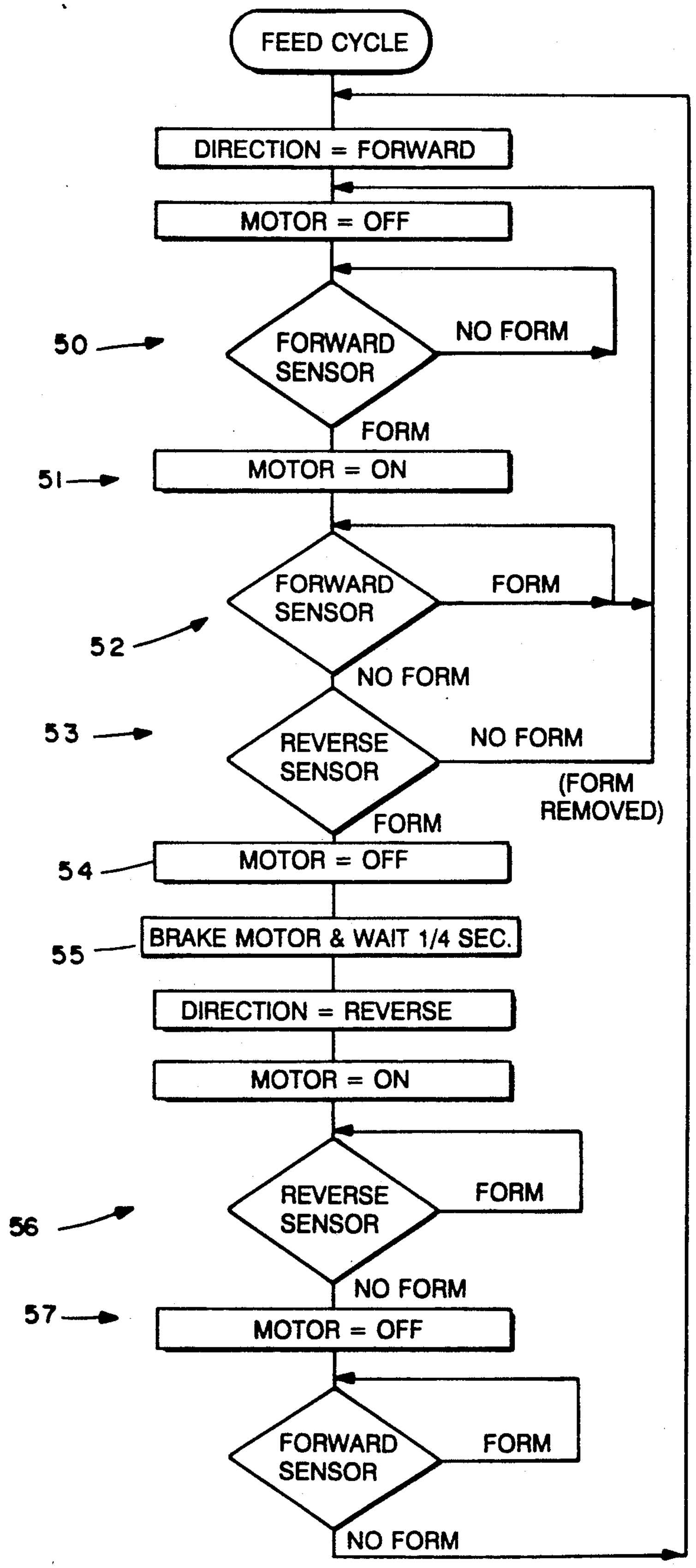
FIG. 5 is a control schematic showing the manner of control of the apparatus of the invention, for practicing the method of the invention.

A control schematic illustrating the details of a control sequence of the apparatus 10 according to the invention, for practicing the method according to the invention, is illustrated in FIG. 5. The operator manually feeds a business form 45 into the nip 23. As the leading edge of the form passes the forward sensor 37, the sensor 37—through the computer chip controller 41—operates the motor 32 to drive it in the forward direction, as indicated at 50 and 51 in FIG. 5. The motor 32 stays on, driving the business form 45 in direction 39, until the trailing edge of the form 45 clears the forward sensor 37, but is still over the reverse sensor 38 (which is almost exactly at the nip 23). This is indicated at 52 and 53 in FIG. 5.

If the form does cover the reverse sensor 38, but no longer the forward sensor 37, the motor 32 is turned off and braked, as indicated at 54 and 55. Then after a delay of approximately a quarter of a second (controlled by chip 41), the controller 41 reverses the direction of rotation of the motor 32, and the form 45 is driven in the second direction 43, back through the nip 23 between the rollers 17, 18. As indicated at 56 and 57, the motor 32 continues to drive the form 45 in the second direction 43 until the reverse sensor 38 is cleared, at which time the form 45 is removed and the form is manually removed.

Typically the business form 45 is not just sealed along one pressure sensitive adhesive strip, but along two or more strips, typically disposed at 90°, and 180°, with respect to the first strip. After removing the form 45, the operator then rotates the form 45 ninety degrees, or 180° depending upon the next strip to be sealed, again places the form on the surface 16 against the edge guide 29, and pushes it into the nip 23, at which time the cycle in FIG. 5 is repeated.

It will thus be seen that according to the present invention a very simple method and apparatus are provided for pressure sealing small quantities of business forms in a manual, or semi-manual, operation. While the invention has been herein shown and described in what is presently conceived to be the most practical and preferred embodiment, it will be apparent to those of ordinary skill in the art that many modifications may be made thereof, which scope is to be accorded the broadest interpretation of the appended claims so as to encompass all equivalent structures and processes.

What is claimed is:

1. A pressure applying apparatus for applying pressure to business forms to activate pressure sensitive adhesive associated with the forms to seal one part of a form to another, comprising:

a frame including a business form support surface elongated in a dimension of elongation;

first and second narrow periphery rollers, rotatable about parallel first and second axes, and biased together to form a nip;

reversible drive means for driving at least one of said rollers alternately clockwise and counterclockwise;

sensor means for sensing the position of a business form supported by said business form support surface, said sensor means being positioned adjacent, but spaced from in the dimension of elongation of said support surface and perpendicular to said first and second axes, said nip; and control means connected to said sensor means and said reversible drive means for driving a business form sensed by said sensor through said nip in a first direction along said support surface dimension of elongation so that a compressive sealing force is applied thereto, and after the business form has passed almost completely through said nip in the first direction, reversing said drive means to drive the business form through said nip again in a second direction,opposite the first direction.

2. Apparatus as recited in claim 1 wherein said sensor means comprises two sensor elements adjacent each other, a first sensor element for initiating and controlling, with said control means, drive of the business form in the first direction, and a second sensor element, located closer to said nip than said first sensor element, for initiating and controlling, with said control means, drive of the business form in the second direction.

3. Apparatus as recited in claim 2 wherein said first and second sensors are reflective sensors.

4. Apparatus as recited in claim 3 wherein said reversible drive means comprises an electric gear motor.

5. Apparatus as recited in claim 4 wherein said electric gear motor is a D.C. motor.

6. Apparatus as recited in claim 4 wherein said control means comprises a computer driver chip.

7. Apparatus as recited in claim 1 wherein said first roller axes is movably mounted, and said second roller axis is stationarily mounted, and wherein said first and second rollers are biased together by spring biasing means acting on said first roller which biases it into contact with said second roller, and wherein said reversible drive means is connected only to said second roller.

8. Apparatus as recited in claim 7 wherein said reversible drive means comprises an electric gear motor connected by gear means to said second roller.

9. Apparatus as recited in claim 1 further comprising a form edge guide extending perpendicular to said support surface and said roller axes, and adjacent said rollers and said nip.

10. Apparatus as recited in claim 8 wherein said control means comprises a computer driver chip.

11. Apparatus as recited in claim 1 wherein said narrow width first and second rollers each have a width of less than about one inch.

12. Apparatus as recited in claim 2 wherein said sensor means are mounted in said frame support surface.

13. Apparatus for driving and applying pressure to a strip of adhesive between two webs, comprising:

a first roller having a movable axis of rotation;

a second roller having a stationary axis of rotation parallel to said first roller axis of rotation;

biasing means for biasing said first roller into contact with said second roller to form a nip;

a support surface extending on both sides of said nip substantially perpendicular to said axes of rotation;

first and second sensors mounted in or above said support surface adjacent, but spaced from, one side of said nip;

a reversible motor connected to said second roller for driving it alternately clockwise and counterclockwise; and control means connected to said sensors and said reversible motor for controlling said motor in response to said sensors.

14. Apparatus as recited in claim 13 wherein said rollers each have a width of less than about one inch.

15. Apparatus as recited in claim 14 further comprising an edge guide extending perpendicular to said support surface and said axes of rotation, adjacent said rollers and said nip.

16. Apparatus as recited in claim 15 wherein said sensors are reflective sensors and said motor is a D. C. gear motor.

* * * * *